United States Patent
Urata et al.

(10) Patent No.: US 10,023,701 B2
(45) Date of Patent: Jul. 17, 2018

(54) WET GEL AND METHOD OF PRODUCING THEREOF

(71) Applicants: Chihiro Urata, Aichi (JP); Atsushi Hozumi, Aichi (JP)

(72) Inventors: Chihiro Urata, Aichi (JP); Atsushi Hozumi, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 15/319,924

(22) PCT Filed: Jun. 19, 2015

(86) PCT No.: PCT/JP2015/067728
§ 371 (c)(1),
(2) Date: Dec. 19, 2016

(87) PCT Pub. No.: WO2015/198985
PCT Pub. Date: Dec. 30, 2015

(65) Prior Publication Data
US 2017/0130007 A1    May 11, 2017

(30) Foreign Application Priority Data

Jun. 24, 2014 (JP) .................. 2014-129294
May 15, 2015 (JP) .................. 2015-100409

(51) Int. Cl.
*C08J 3/09* (2006.01)
*C08K 5/541* (2006.01)
*C08K 5/01* (2006.01)

(52) U.S. Cl.
CPC .............. *C08J 3/092* (2013.01); *C08J 3/098* (2013.01); *C08K 5/01* (2013.01); *C08K 5/541* (2013.01); *C08J 2383/04* (2013.01)

(58) Field of Classification Search
CPC ........ C09J 3/092; C09J 3/098; C09J 2383/04; C08K 5/01; C08K 5/541
See application file for complete search history.

(56) References Cited

U.S. PATENT DOCUMENTS

| | | | |
|---|---|---|---|
| 4,737,537 A | 4/1988 | Schwabe et al. | |
| 5,907,002 A | 5/1999 | Kamohara et al. | |
| 6,495,614 B1 | 12/2002 | Kamohara et al. | |
| 2013/0011606 A1* | 1/2013 | Otomo .................. | C08L 83/04 428/131 |

FOREIGN PATENT DOCUMENTS

| | | |
|---|---|---|
| JP | S62-153346 | 7/1987 |
| JP | H6-145528 | 5/1994 |
| JP | H8-20724 | 1/1996 |
| JP | H10-72307 | 3/1998 |
| JP | 2000-245748 | 9/2000 |
| JP | 2001-342349 | 12/2001 |
| JP | 2008-106260 | 5/2008 |
| JP | 2011-153305 | 8/2011 |
| JP | 2014-201627 | 10/2014 |
| WO | 2008/010533 | 1/2008 |
| WO | 2014/012080 | 1/2014 |

OTHER PUBLICATIONS

International Search Report dated Sep. 15, 2015.

* cited by examiner

*Primary Examiner* — Robert Harlan
(74) *Attorney, Agent, or Firm* — IPUSA, PLLC

(57) ABSTRACT

In an embodiment of the present invention, a wet gel includes a crosslinked silicone resin in which a silicone resin composition is solidified; a first liquid capable of dissolving the silicone resin composition; and one of a solid capable of being dissolved in the first liquid, and a second liquid such that a degree of swelling, when the crosslinked silicone resin is immersed in the second liquid, is less than a degree of swelling when the crosslinked silicone resin is immersed in n-dodecane, wherein the second liquid is capable of being mixed with the first liquid.

8 Claims, 2 Drawing Sheets

REFERENCE EXAMPLE 1    EXAMPLE 1-1

REFERENCE EXAMPLE 1    EXAMPLE 1-1

REFERENCE EXAMPLE 1    EXAMPLE 1-1

REFERENCE EXAMPLE 1        EXAMPLE 1-1

WET GEL AND METHOD OF PRODUCING THEREOF

TECHNICAL FIELD

The present invention relates to wet gel; and a producing method and a product of the wet gel.

BACKGROUND ART

When a liquid droplet adheres to a surface of a solid, corrosion, deterioration, and contamination progress from that point as a starting point. For example, when food adheres to a packaging container of food, occurrence of mold, deterioration of design, and loss of food arise from that point as a starting point. Furthermore, when a liquid droplet residing on a surface of a solid is adhered as it is dried and solidified, adhesion expands from there as a starting point. For this reason, various coating agents that exhibit anti-adhesion properties have been developed.

Patent Document 1 discloses a product having a slippery surface. The product is provided with at least one surface including a super molecular polymer and a lubricating liquid. The super molecular polymer is represented by a general formula PxSy, where P is a polymer crosslinked by a covalent bond; S is a supermolecule block in a polymer network; x+y=1; and y is from 0 to 1. Both the supermolecule polymer and a lubricating liquid have mutual affinity, so that they are absorbed in the super molecular polymer in an amount sufficient to form a slippery lubricating layer on the surface of the super molecular polymer that is swelled by the lubricating liquid.

CITATION LIST

Patent Document

[Patent Document 1]: WO 2014/012080

SUMMARY OF INVENTION

Technical Problem

In Patent Document 1, however, the slippery lubricating layer is formed on a surface of the super molecular polymer that is caused to swell by the lubricating liquid, so that the lubricating liquid is limited to a liquid having predetermined affinity to the super molecular polymer. Furthermore, in Patent Document 1, the adhesion force to ice is 4 kPa, so that the anti-adhesion property is insufficient. Additionally, in Patent Document 1, the lubricating layer may not be spontaneously formed, so that once the lubricating layer is wiped away, the lubricating layer is not reproduced.

In view of the problem with the above-described related art, an object of an aspect of the present invention is to provide a wet gel for which the liquid to be introduced is not limited to a liquid having predetermined affinity with respect to a polymer; that is excellent in an anti-adhesion property; and that can cause spontaneous syneresis.

Here, causing spontaneous syneresis is not limited to a case where syneresis caused by an internal factor (e.g., a decrease in affinity and volatilization of a liquid); and includes a case where syneresis is caused by external stimulation (e.g., a temperature and chemical reaction).

Solution to Problems

A wet gel according to an embodiment of the present invention includes a crosslinked silicone resin in which a silicone resin composition is solidified; a first liquid capable of dissolving the silicone resin composition; and one of a solid capable of being dissolved in the first liquid, and a second liquid such that a degree of swelling, when the crosslinked silicone resin is immersed in the second liquid, is less than a degree of swelling when the crosslinked silicone resin is immersed in n-dodecane, wherein the second liquid is capable of being mixed with the first liquid.

A method of producing a wet gel according to an embodiment of the present invention includes a process of solidifying a silicone resin composition in a presence of a first liquid capable of dissolving the silicone resin composition; and one of a solid capable of being dissolved in the first liquid, and a second liquid such that a degree of swelling when a crosslinked silicone resin is immersed in the second liquid, the silicone resin composition being solidified in the crosslinked silicone resin, is less than a degree of swelling when the crosslinked silicone resin is immersed in n-dodecane, wherein the second liquid is capable of being mixed with the first liquid.

Advantageous Effects of Invention

According to an embodiment of the present invention, a wet gel can be provided for which a liquid to be introduced is not limited to a liquid having predetermined affinity with respect to a polymer; that is excellent in an anti-adhesion property; and that can cause spontaneous syneresis.

DESCRIPTION OF EMBODIMENTS

Figure 1A:
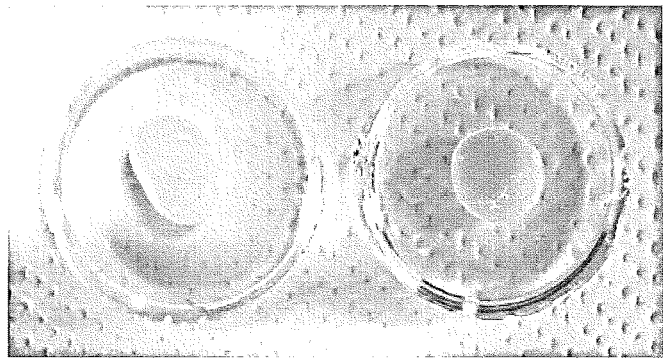
FIG. 1A is a photograph showing a result of evaluation of anti-adhesion properties of a wet gel according to example 1-1 and a crosslinked silicone resin according to reference example 1 with respect to mayonnaise.

Next, embodiments for implementing the present invention are described together with the drawings.

A wet gel includes a crosslinked silicone resin in which a silicone resin composition is solidified; a first liquid capable of dissolving the silicone resin composition; and a solid capable of being dissolved in the first liquid, or a second liquid such that a degree of swelling when the crosslinked silicone resin is immersed in the second liquid is less than a degree of swelling when the crosslinked silicone resin is immersed in n-dodecane. At this time, the second liquid can be mixed with the first liquid.

Note that, in the present specification and the scope of the claims, a liquid capable of dissolving a silicone resin composition means a liquid, when it is mixed with the silicone resin composition, that becomes a transparent solution without causing phase separation.

Furthermore, a solid capable of being dissolved in the first liquid means a liquid, when it is mixed with the first liquid, that becomes a transparent solution.

Additionally, the second liquid that can be mixed with the first liquid means, when the second liquid and the first liquid are mixed, they become a transparent solution without causing phase separation.

The surface of the wet gel is covered with a liquid generated by syneresis, so that a liquid, such as water or an oil, is prevented from directly contacting the wet gel, and it is excellent in an anti-adhesion property. Furthermore, even if a liquid on the surface of the wet gel is generated by syneresis is removed by cotton, alcohol, and so forth, or is oxidatively decomposed by oxygen plasma, syneresis of the wet gel is gradually progressed. As a result, the surface of the wet gel is again covered with a liquid generated by syneresis. When the crosslinked silicone resin is an elastic body, the volume of the wet gel decreases as syneresis progresses. Furthermore, when a liquid generated by syneresis is solidified by reacting with moisture in the atmosphere, the surface of the wet gel is covered with the produced solid. In this case, even if the solid generated on the surface of the wet gel is removed, syneresis of the wet gel is gradually progressed, so that the surface of the wet gel is covered with the generated solid again. Furthermore, when a liquid generated by syneresis includes a solid, the surface of the wet gel is covered with the solid. At this time, the solid is self-assembled to form a fractal microstructure, and the surface of the wet gel may exhibit superhydrophobicity. In this case, even if the solid generated on the surface of the wet gel is removed, or the wet gel is cut, syneresis of the wet gel is continuously and gradually progressed, so that the surface of the wet gel is covered with the generated solid again. Furthermore, syneresis may also be induced by temporal change of the crosslinked silicone resin included in the wet gel; or temporal change of the first liquid and/or the second liquid. Additionally, when the first liquid does not serve as the second liquid, syneresis can be promoted by volatilizing the first liquid having a vapor pressure higher than that of the second liquid.

Note that, when the wet gel is cooled, the wet gel may lose transparency. This is considered to be caused by promoting phase separation between the first liquid and the crosslinked silicone resin inside the wet gel to scatter light.

Furthermore, by using materials with excellent heat resistance as the first liquid and the solid capable of being dissolved in the first liquid or the second liquid, fire resistivity can be added to, so that, even if a material attached to the surface of the wet gel is adhered to it by drying and burning, it can be easily removed.

The wet gel can be produced by solidifying a silicone resin composition under presence of the first liquid, and a solid that can be dissolved in the first liquid or the second liquid.

The silicone resin composition preferably includes a chemical compound having a vinyl group and a compound having a hydrosilyl group. As a result, when the silicone resin composition is solidified, the hydrosilylation reaction proceeds, and the crosslinked silicone resin is produced.

The chemical compound having a vinyl group is not particularly limited; however, there are a silicone resin having a vinyl group, and a metal alkoxide having a vinyl group, and so forth.

As the silicone resin having a vinyl group, there are modified polydimethylsiloxane, polymethylvinylsiloxane, and so forth, in which vinyl groups are introduced at both ends.

As the metal alkoxide having the vinyl group, there are vinyltriethoxysilane, allyltriethoxysilane, and so forth.

The chemical compound having a hydrosilyl group is not particularly limited; however, there are a silicone resin having a hydrosilyl group, and a metal alkoxide having a hydrosilyl group, and so forth.

As the silicone resin having the hydrosilyl group, there are dimethylmethyl hydrogen polysiloxane, and so forth.

As the metal alkoxide having the hydrosilyl group, there are triethoxysilane, trimethoxysilane, and so forth.

For solidifying the silicone resin compound, a platinum-based catalyst may be used.

The platinum-based catalyst is not particularly limited; however, there are Karsted's catalyst ($Pt_2[(Me_2SiCH=CH_2)_2O]_3$), $H_2PtCl_6$, and so forth.

For solidifying the silicone resin compound, the liquid including the silicone resin compound, the first liquid, and the solid capable of being dissolved in the first liquid or the second liquid is usually transparent.

For solidifying the silicone resin compound, it may be heated.

The temperature for solidifying the silicone resin compound may be appropriately controlled depending on an amount of the added catalyst; however, it is usually from 20° C. to 150° C.

The first liquid is not particularly limited; however, there are alkane, silicone oil, polymethylphenylsiloxane, toluene, tetraalkoxysilane, polyalkoxysiloxane, and so forth.

When tetraalkoxysilane or polyalkoxysiloxane is used as the first liquid, the alkoxy group is hydrolyzed in the presence of an acid or a base to lower the affinity to the crosslinked silicone resin, and it can behave as the second liquid.

As the alkane, there are n-decane, n-dodecane, n-tetradecane, n-hexadecane, isocetane, and so forth.

The solid capable of being dissolved in the first liquid is not particularly limited; however, there are tristarin, lotus leaf extract, and so forth.

The second liquid is not particularly limited; however, there are n-tetradecane, n-hexadecane, trichlorooctadecylsilane, polymethylphenylsiloxane, phenylmethylsiloxane-dimethylsiloxane copolymer, and so forth.

Note that the second liquid may also server as the first liquid.

The wet gel is usually transparent and has plasticity.

When the wet gel is cooled, the affinity between the crosslinked silicone resin and the first liquid and/or the second liquid is lowered, and syneresis is promoted. In addition, when the temperature for cooling the wet gel is lower than or equal to the melting point of the first liquid and/or the second liquid, the first liquid and/or the second liquid can be extracted as a solid.

Furthermore, when the first liquid does not server as the second liquid, if the first liquid is volatilized, the affinity of the crosslinked silicone resin to the first liquid and to the second liquid is lowered, and syneresis is promoted.

The wet gel may further include particles. In this manner, the hardness and a sterilizing property of the wet gel can be enhanced, and the light permeability can be adjusted.

The particles are not particularly limited; however, there are silica particles, alumina particles, zirconia particles, silver particles, gold particles, platinum particles, magnetic particles, and so forth.

In the particles, vinyl groups, hydrosilyl groups, and so forth may be introduced on the surfaces. In this manner, the particles can be fixed to the crosslinked silicone resin.

The wet gel can be produced by solidifying the silicone resin compound in the presence of the first liquid, and the solid or the second liquid.

Here, the silicone gel may be used as it is, or may be formed on the surface of a solid to be used.

In the solid, a vinyl group, a hydrosilyl group, and so forth may be introduced on the surface. In this manner, the adhesion between the wet gel and the solid can be strengthened.

EXAMPLES

Next, the present invention is specifically described based on examples; however, the present invention is not limited to the examples. Note that a part means a part by mass.

[Degree of Swelling]

First, as the silicone resin compound, one part of Sylgard 184 main agent (manufactured by Dow Corning Corporation) and 0.1 parts of Sylgard 184 hardener (manufactured by Dow Corning Corporation) were mixed, the resultant was solidified for two hours at 100° C. by using an oven, and the crosslinked silicone resin was obtained. Subsequently, the crosslinked silicone resin was immersed in the liquid for 74 hours.

The degree of swelling was calculated from the formula $V/V_0$, where $V_0$ was a volume of the crosslinked silicone resin, and V was the volume of the crosslinked silicone resin after it was immersed in the liquid.

Table 1 shows the degree of swelling.

TABLE 1

| Liquid | Degree of swelling |
|---|---|
| n-hexane | 2.45 |
| n-octane | 2.31 |
| n-decane | 2.12 |
| n-dodecane | 1.94 |
| n-tetradecane | 1.73 |
| n-hexadecane | 1.52 |
| Isocetane | 1.96 |
| Toluene | 2.24 |
| Trichloroctadecylsilane | 1.14 |
| Octyltriethoxysilane | 1.75 |
| Tetraethoxysilane | 1.90 |
| AR20 | 1.68 |
| CR100 | 1.41 |
| TSF431 | 1.33 |
| TSF437 | 1.50 |
| PMM-0021 | 0.96 |
| AS100 | 1.37 |

Example 1-1

One part of Sylagard 184 main agent (manufactured by Dow Corning Corporation) and 0.1 parts of Sylagard 184 hardener (manufactured by Dow Corning Corporation) as a silicone resin composition, and 3 parts of n-hexadecane as the first liquid also serving as the second liquid were mixed to obtain a transparent precursor solution. Subsequently, the precursor solution was heated for two hours at 100° C. by using an oven to solidify the silicone resin composition, and thereby the wet gel was obtained. The wet gel was transparent and had plasticity.

The Sylgard 184 main agent includes modified polydimethylsiloxane, 2,2-dimethylvinyl group, and 1,2-dimethylvinyl group such that vinyl groups are introduced at both ends; and a surface-treated silica filler, tetrakis (trimethylsiloxy) silane, ethylbenzene, and platinum-based catalyst such that trimethylmethyl group is introduced on its surface.

The Sylgard 184 hardener includes dimethylmethyl hydrogen polysiloxane, modified polydimethylsiloxane, 2,4,6,8-tetramethyl-2,4,6,8-tetravinylcyclotetra, 2,2-dimethylvinyl group, and 1,2-dimethylvinyl group such that vinyl groups are introduced at both ends; and a surface-treated silica filler, and ethylbenzene such that trimethylmethyl group are introduced on the surface.

Here, n-hexadecane was able to dissolve the silicone resin composition.

Examples 1-2 Through 1-9

The wet gels were obtained similar to example 1-1, except that the added amounts of n-hexadecane were respectively changed to 1.5 parts, 2 parts, 2.5 parts, 5 parts, 7 parts, 9 pars, 12 parts, and 19 parts. The wet gels were transparent and had plasticity.

When the wet gels according to examples 1-1 through 1-9 were left to stand for 1 hour, syneresis was progressed in the wet gels. Furthermore, when each of the wet gels according to examples 1-1 through 1-9 was cut, and then left to stand for 1 hour, syneresis was progressed on the cutting surface, and syneresis was continued for 2 weeks or more.

Examples 1-10 Through 1-12

The wet gels were obtained similar to example 1-1, except that polymethylphenylsiloxane CR100 (manufactured by Sigma-Aldrich), polymethylphenylsiloxane TSF 431 (manufactured by MOMENTIVE) and phenylmethylsiloxane-dimethylsiloxane copolymer AS 100 (manufactured by Sigma-Aldrich) were used, respectively, instead of n-hexadecane. The wet gels were transparent and had plasticity.

Note that CR100, TSF431, and AS100 were able to dissolve the silicone resin composition.

When the wet gels according to examples 1-10 through 1-12 were left to stand for 1 hour, syneresis was progressed in the wet gels. Furthermore, when each of the wet gels according to examples 1-10 through 1-12 was cut, and then left to stand for 1 hour, syneresis was progressed on the cutting surface, and syneresis was continued for 3 months or more. Furthermore, for each of the wet gels according to examples 1-10 through 1-12, when the surface was roughened with a cutter knife to lower the transparency, the transparency of the surface was recovered by syneresis.

Reference Example 1

The crosslinked silicone resin was obtained similar to example 1-1, except that the n-hexadecane was not added.

Reference Examples 2 Through 7

The wet gels were obtained similar to example 1-1, except that n-hexane, n-octane, n-decane, n-dodecane, toluene, and tetraethoxysilane were used as the first liquid, respectively, instead of the n-hexadecane. The wet gels were transparent and had plasticity.

Note that n-hexane, n-octane, n-decane, n-dodecane, toluene, and tetraethoxysilane were able to dissolve the silicone resin composition.

When the wet gels according to reference examples 2 through 7 were left to stand for 1 hour, syneresis was not progressed in the wet gels. Furthermore, even if the wet gels according to reference examples 2 through 7 were cooled, syneresis was not progressed in the wet gels.

[Anti-Adhesion Property with Respect to Mayonnaise and Ketchup]

After attaching mayonnaise or ketchup to the surface of the wet gel (or the crosslinked silicone resin), it was tilted by a tilt angle of 10 degrees to evaluate the anti-adhesion property with respect to mayonnaise and ketchup.

Figure 1B:
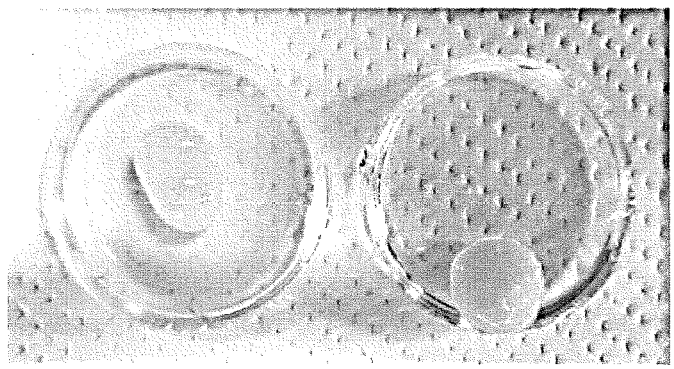
FIG. 1B is a photograph showing the result of the evaluation of the anti-adhesion properties of the wet gel according to example 1-1 and the crosslinked silicone resin according to reference example 1 with respect to mayonnaise.

FIG. 1 shows a result of the evaluation of the anti-adhesion property of the wet gel according to example 1-1 and the crosslinked silicone resin according to reference example 1 with respect to mayonnaise. Here, FIG. 1A and FIG. 1B respectively show the wet gel and the crosslinked silicone resin prior to and after tilting, after mayonnaise was attached to the surface.

Figure 2A:
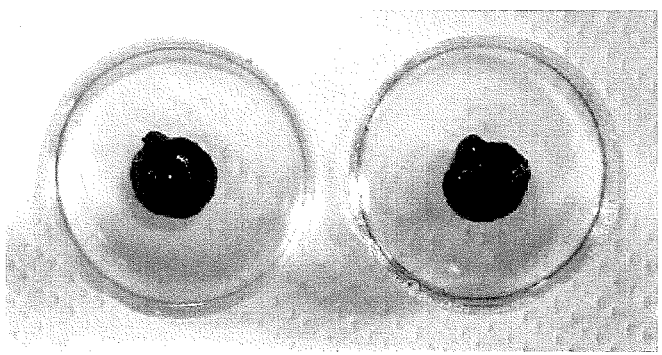
FIG. 2A is a photograph showing a result of evaluation of anti-adhesion properties of the wet gel according to example 1-1 and the crosslinked silicone resin according to reference example 1 with respect to ketchup.
Figure 2B:
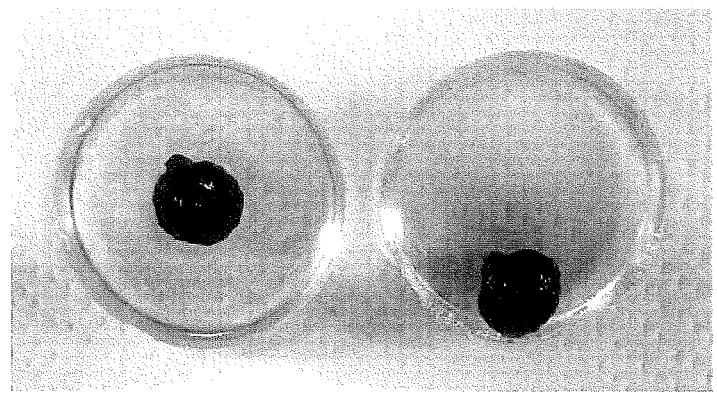
FIG. 2B is a photograph showing the result of the evaluation of the anti-adhesion properties of the wet gel according to example 1-1 and the crosslinked silicone resin according to reference 1 with respect to ketchup.

FIG. 2 shows a result of the evaluation of the anti-adhesion property of the wet gel according to example 1-1 and the crosslinked silicone resin according to reference example 1 with respect to ketchup. Here, FIG. 2A and FIG. 2B respectively show the wet gel and the crosslinked silicone resin prior to and after tilting, after ketchup was attached to the surface.

From FIG. 1 and FIG. 2, it can be seen that mayonnaise and ketchup were not adhered to the surface of the wet gel according to example 1-1, and that it was excellent in the anti-adhesion property with respect to mayonnaise and ketchup.

In contrast, mayonnaise and ketchup were adhered to the surface of the crosslinked silicone resin according to reference example 1, and the anti-adhesion property with respect to mayonnaise and ketchup was unfavorable.

Note that, similar to the wet gel according to example 1-1, the wet gels according to examples 1-2 through 1-12 were excellent in the anti-adhesion property with respect to mayonnaise and ketchup. However, similar to the crosslinked silicone resin according to reference example 1, the anti-adhesion properties of the wet gels according to reference examples 2 through 7 were unfavorable.

Furthermore, when a syneresis layer was wiped out for each of the wet gels according to examples 1-1 through 1-12, the anti-adhesion property with respect to mayonnaise was temporarily lowered; however, as time elapsed, the anti-adhesion property that was the same as that of prior to wiping the syneresis layer was exhibited.

Furthermore, even if the mayonnaise and ketchup adhered to the surface were heated and dried, the dried adhered material could be easily removed from each of the wet gels according to examples 1-1 through 1-12.

Example 2-1

The wet gel was obtained similar to example 1-1, except that 0.38 parts of n-decane as the first liquid and 1.13 parts of n-hexadecane as the second liquid were used instead of 3 parts of n-hexadecane. The wet gel was transparent and had plasticity.

Note that n-decane was able to dissolve the silicone resin composition. Furthermore, n-hexadecane was able to be mixed with n-decane.

Example 2-2

The wet gel was obtained similar to example 2-1, except that the added amounts of n-decane and n-hexadecane were changed to 0.15 parts and 1.35 parts, respectively. The wet gel was transparent and had plasticity.

Example 2-3

The wet gel was obtained similar to example 2-1, except that the added amounts of n-decane and n-hexadecane were changed to 0.08 parts and 1.42 parts, respectively. The wet gel was transparent and had plasticity.

Example 2-4

The wet gel was obtained similar to example 2-1, except that the added amounts of n-decane and n-hexadecane were changed to 0.75 parts and 2.25 parts, respectively. The wet gel was transparent and had plasticity.

Example 2-5

The wet gel was obtained similar to example 2-1, except that the added amounts of n-decane and n-hexadecane were changed to 0.3 parts and 2.7 parts, respectively. The wet gel was transparent and had plasticity.

Example 2-6

The wet gel was obtained similar to example 2-1, except that the added amounts of n-decane and n-hexadecane were changed to 0.16 parts and 2.84 parts, respectively. The wet gel was transparent and had plasticity.

When each of the wet gels according to examples 2-1 through 2-6 was left to stand for 1 hour, syneresis was progressed for the wet gel. Furthermore, when each of the wet gels according to examples 2-1 through 2-6 was cut and left for 1 hour, syneresis was progressed on the cutting surface of the wet gel.

The wet gels according to examples 2-1 through 2-6 were excellent in the anti-adhesion property with respect to mayonnaise and ketchup, similar to the wet gel according to example 1-1.

Example 3-1

The wet gel was obtained similar to example 1-1, except that 0.38 parts of n-dodecane as the first liquid and 1.42 parts of n-hexadecane as the second liquid were used instead of 3 parts of n-hexadecane. The wet gel was transparent and had plasticity.

Note that n-dodecane was able to dissolve the silicone resin composition. Furthermore, n-hexadecane was able to be mixed with n-dodecane.

Example 3-2

The wet gel was obtained similar to example 3-1, except that the added amounts of n-dodecane and n-hexadecane were changed to 0.6 parts and 5.4 parts, respectively. The wet gel was transparent and had plasticity.

Example 3-3

The wet gel was obtained similar to example 3-1, except that the added amounts of n-dodecane and n-hexadecane were changed to 0.32 parts and 5.68 parts, respectively. The wet gel was transparent and had plasticity.

Example 3-4

The wet gel was obtained similar to example 3-1, except that the added amounts of n-dodecane and n-hexadecane were changed to 0.16 parts and 2.84 parts, respectively. The wet gel was transparent and had plasticity.

When each of the wet gels according to examples 3-1 through 3-4 was left to stand for 1 hour, syneresis was progressed for the wet gel. Furthermore, when each of the wet gels according to examples 3-1 through 3-4 was cut and left for 1 hour, syneresis was progressed on the cutting surface of the wet gel.

The wet gels according to examples 3-1 through 3-4 were excellent in the anti-adhesion property with respect to mayonnaise and ketchup, similar to the wet gel according to example 1-1.

Example 4-1

The wet gel was obtained similar to example 1-1, except that 0.08 parts of n-tetradecane as the first liquid and 1.42 parts of n-hexadecane as the second liquid were used instead of 3 parts of n-hexadecane. The wet gel was transparent and had plasticity.

Note that n-tetradecane and n-hexadecane were able to dissolve the silicone resin composition. Furthermore, n-hexadecane was able to be mixed with n-tetradecane.

Example 4-2

The wet gel was obtained similar to example 4-1, except that the added amounts of n-tetradecane and n-hexadecane were changed to 0.63 parts and 1.37 parts, respectively. The wet gel was transparent and had plasticity.

Example 4-3

The wet gel was obtained similar to example 4-1, except that the added amounts of n-tetradecane and n-hexadecane were changed to 0.32 parts and 5.68 parts, respectively. The wet gel was transparent and had plasticity.

Example 4-4

The wet gel was obtained similar to example 4-1, except that the added amounts of n-tetradecane and n-hexadecane were changed to 0.16 parts and 2.84 parts, respectively. The wet gel was transparent and had plasticity.

When each of the wet gels according to examples 4-1 through 4-4 was left to stand for 1 hour, syneresis was progressed for the wet gel. Furthermore, when each of the wet gels according to examples 4-1 through 4-4 was cut and left for 1 hour, syneresis was progressed on the cutting surface of the wet gel, and syneresis was continued for more than 20 days.

The wet gels according to examples 4-1 through 4-4 were excellent in the anti-adhesion property with respect to mayonnaise and ketchup, similar to the wet gel according to example 1-1.

Example 5-1

The wet gel was obtained similar to example 1-1, except that 0.8 parts of n-decane as the first liquid and 0.2 parts of polymethylphenylsiloxane PNM-0021 (manufactured by Gelest) as the first liquid that also serves as the second liquid were used instead of 3 parts of n-hexadecane. The wet gel was transparent and had plasticity.

Note that n-decane and PMM-0021 were able to dissolve the silicone resin composition. Furthermore, PMM-0021 was able to be mixed with n-decane.

Example 5-2

The wet gel was obtained similar to example 5-1, except that the added amounts of n-decane and PMM-0021 were changed to 1.8 parts and 1.2 parts, respectively. The wet gel was transparent and had plasticity.

Example 5-3

The wet gel was obtained similar to example 5-1, except that the added amounts of n-decane and PMM-0021 were changed to 1.2 parts and 1.8 parts, respectively. The wet gel was transparent and had plasticity.

Example 5-4

The wet gel was obtained similar to example 5-1, except that the added amounts of n-decane and PMM-0021 were changed to 0.6 parts and 2.4 parts, respectively. The wet gel was transparent and had plasticity.

Example 5-5

The wet gel was obtained similar to example 5-1, except that the added amounts of n-decane and PMM-0021 were changed to 2.4 parts and 1.6 parts, respectively. The wet gel was transparent and had plasticity.

Example 5-6

The wet gel was obtained similar to example 5-1, except that the added amounts of n-decane and PMM-0021 were changed to 0 parts and 3.0 parts, respectively. The wet gel was transparent and had plasticity.

When each of the wet gels according to examples 5-1 through 5-6 was left to stand for 1 hour, syneresis was progressed for the wet gel. At that time, when the wet gel was cooled, syneresis was promoted; however, when the wet gel was heated, syneresis was suppressed. Furthermore, when each of the wet gels according to examples 5-1 through 5-6 was cut and left for 1 hour, syneresis was progressed on the cutting surface of the wet gel.

The wet gels according to examples 5-1 through 5-6 were excellent in the anti-adhesion property with respect to mayonnaise and ketchup, similar to the wet gel according to example 1-1.

[Anti-Adhesion Property 1 with Respect to Ice]

The anti-adhesion property with respect to ice was evaluated by dropping 50 µL of water droplets on the surface of the wet gel, leaving it in a freezer at −30° C. for 30 minutes, and pulling up the ice.

For the wet gels according to examples 5-1 through 5-6, no ice remained, and the anti-adhesion property with respect to ice was excellent.

Example 6

The wet gel was obtained similar to example 1-1, except that 3 parts of n-dodecane as the first liquid and 1 part of polymethylphenylsiloxane PMM-0021 (manufactured by Gelest) as the first liquid that also serves as the second liquid were used instead of 3 parts of n-hexadecane. The wet gel was transparent and had plasticity.

Note that n-decane and PMM-0021 were able to dissolve the silicone resin composition. Furthermore, PNM-0021 was able to be mixed with n-decane.

When the wet gel according to example 6 was left to stand for 1 hour, syneresis was progressed for the wet gel. At that time, when the wet gel was cooled, syneresis was promoted; however, when the wet gel was heated, syneresis was suppressed. Furthermore, when the wet gel according to example 6 was cut and left for 1 hour, syneresis was progressed on the cutting surface of the wet gel.

The wet gel according to example 6 was excellent in the anti-adhesion property with respect to mayonnaise and ketchup, similar to the wet gel according to example 1-1.

Example 7-1

The wet gel was obtained similar to example 1-1, except that 3 parts of n-tetradecane and 1 part of polymethylphenylsiloxane PMM-0021 (manufactured by Gelest) as the first liquid that also serve as the second liquid were used instead of 3 parts of n-hexadecane. The wet gel was transparent and had plasticity.

Note that n-tetradecane and PMM-0021 were able to dissolve the silicone resin composition. Furthermore, PMM-0021 was able to be mixed with n-tetradecane.

Example 7-2

The wet gel was obtained similar to example 7-1, except that the added amounts of n-tetradecane and PMM-0021 were changed to 0.75 parts and 0.25 parts, respectively. The wet gel was transparent and had plasticity.

Example 7-3

The wet gel was obtained similar to example 7-1, except that the added amounts of n-tetradecane and PMM-0021 were changed to 1.5 parts and 0.5 parts, respectively. The wet gel was transparent and had plasticity.

Example 7-4

The wet gel was obtained similar to example 7-1, except that the added amounts of n-tetradecane and PMM-0021 were changed to 2.25 parts and 0.75 parts, respectively. The wet gel was transparent and had plasticity.

When each of the wet gels according to examples 7-1 through 7-4 was left to stand for 1 hour, syneresis was progressed for the wet gel. At that time, when the wet gel was cooled, syneresis was promoted; however, when the wet gel was heated, syneresis was suppressed. Furthermore, when each of the wet gels according to examples 7-1 through 7-4 was cut and left for 1 hour, syneresis was progressed on the cutting surface of the wet gel.

The wet gels according to examples 7-1 through 7-4 were excellent in the anti-adhesion property with respect to mayonnaise and ketchup, similar to the wet gel according to example 1-1.

Example 8

The wet gel was obtained similar to example 1-1, except that 3 parts of n-hexadecane and 1 part of polymethylphenylsiloxane PMM-0021 (manufactured by Gelest) as the first liquid that also serves as the second liquid were used instead of 3 parts of n-hexadecane. The wet gel was transparent and had plasticity.

Note that n-hexadecane and PMM-0021 were able to dissolve the silicone resin composition. Furthermore, PMM-0021 was able to be mixed with n-tetradecane.

When the wet gel according to example 8 was left to stand for 1 hour, syneresis was progressed for the wet gel. At that time, when the wet gel was cooled, syneresis was promoted; however, when the wet gel was heated, syneresis was suppressed. Furthermore, when the wet gel according to example 8 was cut and left for 1 hour, syneresis was progressed on the cutting surface of the wet gel.

The wet gel according to example 8 was excellent in the anti-adhesion property with respect to mayonnaise and ketchup, similar to the wet gel according to example 1-1.

Example 9

The wet gel was obtained similar to example 1-1, except 2.8 parts of isocetane as the first liquid and 1 part of polymethylphenylsiloxane PMM-0021 (manufactured by Gelest) as the first liquid that also serves as the second liquid were used instead of 3 parts of n-hexadecane. The wet gel was transparent and had plasticity.

Note that isocetane and PMM-0021 were able to dissolve the silicone resin composition. Furthermore, PMM-0021 was able to be mixed with isocetane.

When the wet gel according to example 9 was left to stand for 1 hour, syneresis was progressed for the wet gel. At that time, when the wet gel was cooled, syneresis was promoted; however, when the wet gel was heated, syneresis was suppressed. Furthermore, when the wet gel according to example 9 was cut and left for 1 hour, syneresis was progressed on the cutting surface of the wet gel.

The wet gel according to example 9 was excellent in the anti-adhesion property with respect to mayonnaise and ketchup, similar to the wet gel according to example 1-1. Furthermore, the wet gel according to example 9 was excellent in the anti-adhesion property with respect to ice, similar to the wet gel according to example 5-1.

Example 10-1

The wet gel was obtained similar to example 1-1, except that 0.6 parts of polymethylphenylsiloxane AR 20 (manufactured by Sigma-Aldrich) as a first liquid serving also as a second liquid and 2.4 parts of polymethylphenylsiloxane TSF 437 (manufactured by MOMENTIVE) as a second liquid were used instead of 3 parts of n-hexadecane. The wet gel was transparent and had plasticity.

Note that AR20 was able to dissolve the silicone resin composition. Furthermore, TSF437 was able to be mixed with AR20.

Example 10-2

The wet gel was obtained similar to example 10-1, except that the added amounts of AR20 and TSF437 were changed to 0.9 parts and 2.1 parts, respectively. The wet gel was transparent and had plasticity.

Example 10-3

The wet gel was obtained similar to example 10-1, except that the added amounts of AR20 and TSF437 were changed to 1.2 parts and 1.8 parts, respectively. The wet gel was transparent and had plasticity.

Example 10-4

The wet gel was obtained similar to example 10-1, except that the added amounts of AR20 and TSF437 were changed to 1.8 parts and 1.2 parts, respectively. The wet gel was transparent and had plasticity.

When each of the wet gels according to examples 10-1 through 10-4 was left to stand for 1 hour, syneresis was progressed for the wet gel. At that time, when the wet gel was cooled, syneresis was promoted; however, when the wet gel was heated, syneresis was suppressed. Furthermore, when each of the wet gels according to examples 10-1 through 10-4 was cut and left for 1 hour, syneresis was progressed on the cutting surface of the wet gel.

The wet gels according to examples 10-1 through 10-4 were excellent in the anti-adhesion property with respect to mayonnaise and ketchup, similar to the wet gel according to example 1-1.

Example 10-5

The wet gel was obtained similar to example 10-1, except that the added amounts of AR20 and TSF437 were changed to 2.1 parts and 0.9 parts, respectively. The wet gel was transparent and had plasticity.

Example 10-6

The wet gel was obtained similar to example 10-1, except that the added amounts of AR20 and TSF437 were changed to 2.25 parts and 0.75 parts, respectively. The wet gel was transparent and had plasticity.

Example 10-7

The wet gel was obtained similar to example 10-1, except that the added amounts of AR20 and TSF437 were changed to 2.4 parts and 0.6 parts, respectively. The wet gel was transparent and had plasticity.

Example 10-8

The wet gel was obtained similar to example 10-1, except that the added amounts of AR20 and TSF437 were changed to 3 parts and 0 parts, respectively. The wet gel was transparent and had plasticity.

When each of the wet gels according to examples 10-5 through 10-8 was left to stand for 1 hour, syneresis was not progressed for the wet gel. However, when the wet gel was cooled, syneresis was promoted. Then, when the wet gel was heated, syneresis was suppressed, and liquid generated by syneresis was absorbed inside the wet gel. Furthermore, when the wet gel was cut and left for 1 hour, syneresis was progressed on the cutting surface of the wet gel.

[Anti-Adhesion Property 2 with Respect to Ice]

A polypropylene container was placed on the surface of the wet gel, 50 mL of pure water was added inside the container, and the container was left stand for 3 hours at −15° C. Next, pressure was applied to the container in the lateral direction, and adhesion force with respect to ice was measured by using a load cell, and thereby the anti-adhesion property with respect to ice was evaluated.

For the wet gel according to example 10-8, the adhesion force with respect to ice was 3 kPa.

For the wet gel according to example 10-6, syneresis was progressed below the freezing point.

Furthermore, for the wet gel according to example 10-6, the adhesion force with respect to ice was 0.4 kPa. Additionally, when the surface of the wet gel according to example 10-6 was tilted by 20 degrees, the ice slid down by its own weight, so that it was found that the wet gel according to example 10-6 was excellent in the anti-adhesion property.

For the crosslinked silicone resin according to reference example 1, the adhesion force with respect to ice was 74.1 kPa.

For the wet gel according to reference example 6, the adhesion force with respect to ice was 16.7 kPa.

[Anti-Adhesion Property with Respect to Seaweed]

After immersing the wet gel in the sea for 1 month, the surface of the wet gel was observed, and the anti-adhesion property with respect to seaweed was evaluated by calculating an adhesion ratio of seaweed by the formula: (a surface area of the wet gel were the seaweed was adhered)/(the surface area of the wet gel)×100.

For the wet gels according to examples 10-3 through 10-5, the adhesion ratio of seaweed was less than or equal to 10%, and the anti-adhesion property with respect to seaweed was excellent.

For the crosslinked silicon resin according to reference example 1, the adhesion ratio of seaweed was greater than or equal to 50%, and the anti-adhesion property with respect to seaweed was unfavorable.

Example 11-1

The wet gel was obtained similar to example 1-1, except that 4 parts of toluene as the first liquid and 0.04 parts of tristearin as the solid were used, instead of 3 parts of n-hexadecane. The wet gel was transparent and had plasticity.

Note that toluene was able to dissolve the silicone resin composition and tristearin.

Example 11-2

The wet gel was obtained similar to example 11-1, except that the added amount of tristearin was changed to 0.03 parts. The wet gel was transparent and had plasticity.

Example 11-3

The wet gel was obtained similar to example 11-1, except that the added amounts of toluene and tristearin were changed to 3 parts and 0.01 parts, respectively. The wet gel was transparent and had plasticity.

Example 11-4

The wet gel was obtained similar to example 11-1, except that the added amounts of toluene and tristearin were changed to 3 parts and 0.03 parts, respectively. The wet gel was transparent and had plasticity.

Example 11-5

The wet gel was obtained similar to example 11-1, except that the added amounts of toluene and tristearin were changed to 3 parts and 0.06 parts, respectively. The wet gel was transparent and had plasticity.

Example 11-6

The wet gel was obtained similar to example 11-1, except that the added amounts of toluene and tristearin were changed to 3 parts and 0.12 parts, respectively. The wet gel was transparent and had plasticity.

Example 11-7

The wet gel was obtained similar to example 11-1, except that the added amounts of toluene and tristearin were changed to 3 parts and 0.24 parts, respectively. The wet gel was transparent and had plasticity.

Example 11-8

The wet gel was obtained similar to example 11-1, except that 3 parts of a solution obtained by saturating lotus leaf extract was used, instead of the 4 parts of toluene and 0.04 parts of tristearin. The wet gel was transparent and had plasticity.

When each of the wet gels according to examples 11-1 through 11-8 was left to stand for 1 hour, syneresis was progressed for the wet gel. Furthermore, when each of the wet gels according to examples 11-1 through 11-8 was cut and left for 1 hour, syneresis was progressed on the cutting surface of the wet gel.

The wet gels according to examples 11-1 through 11-8 were excellent in the anti-adhesion property with respect to mayonnaise and ketchup, similar to the wet gel according to example 1-1.

[Anti-Adhesion Property with Respect to Water]

The anti-adhesion property with respect to water was evaluated by measuring a static contact angle of the surface of the wet gel with respect to water.

The wet gel according to example 11-1 was transparent and the static contact angle with respect to water was approximately 100 degrees; however, as syneresis was progressed, the surface became clouded and the static contact angle with respect to water became greater than or equal to 150 degrees, so that superhydrophobicity was exhibited. As a result, it was found that the wet gel according to example 11-1 was excellent in the anti-adhesion property with respect to water. Furthermore, when the wet gel according to example 11-1 was cut, the cutting surface became clouded and superhydrophobicity was exhibited, as syneresis was progressed.

Similar to the wet gel according to example 11-1, the wet gel according to examples 11-2 through 11-8 were excellent in the anti-adhesion property with respect to water.

Example 12

The wet gel was obtained similar to example 1-1, except that 2.4 parts of n-decane as the first liquid and 0.6 parts of trichloro-octadecylsilane as the second liquid were used, instead of 3 parts of n-hexadecane. The wet gel was transparent and had plasticity.

Note that n-decane was able to dissolve the silicone resin composition. Furthermore, trichloro-octadecylsilane was able to be mixed with n-decane.

When the wet gel according to example 12 was left to stand for 1 hour, syneresis was progressed for the wet gel. Furthermore, when the wet gel according to example 12 was cut and left for 1 hour, syneresis was progressed on the cutting surface of the wet gel.

The wet gel according to example 12 was excellent in the anti-adhesion property with respect to mayonnaise and ketchup, similar to the wet gel according to example 1-1. Furthermore, similar to the wet gel according to example 11-1, the wet gel according to example 12 was excellent in the anti-adhesion property with respect to water.

Example 13

The wet gel was obtained similar to example 1-1, except that 2.9 parts of n-dodecane as the first liquid and 0.1 parts of trichloro-octadecylsilane as the second liquid were used, instead of 3 parts of n-hexadecane. The wet gel was transparent and had plasticity.

Note that n-dodecane was able to dissolve the silicone resin composition. Furthermore, trichloro-octadecylsilane was able to be mixed with n-dodecane.

When the wet gel according to example 13 was left to stand for 1 hour, syneresis was progressed for the wet gel. Furthermore, when the wet gel according to example 13 was cut and left for 1 hour, syneresis was progressed on the cutting surface of the wet gel.

The wet gel according to example 13 was excellent in the anti-adhesion property with respect to mayonnaise and ketchup, similar to the wet gel according to example 1-1. Furthermore, similar to the wet gel according to example 11-1, the wet gel according to example 13 was excellent in the anti-adhesion property with respect to water.

Example 14

The wet gel was obtained similar to example 1-1, except that 4 parts of n-tetradecane as the first liquid which also serves as the second liquid, and 0.06 parts of trichloro-octadecylsilane as the second liquid were used, instead of 3 parts of n-hexadecane. The wet gel was transparent and had plasticity.

Note that n-tetradecane was able to dissolve the silicone resin composition. Furthermore, trichloro-octadecylsilane was able to be mixed with n-tetradecane.

When the wet gel according to example 14 was left to stand for 1 hour, syneresis was progressed for the wet gel. Furthermore, when the wet gel according to example 14 was cut and left for 1 hour, syneresis was progressed on the cutting surface of the wet gel.

The wet gel according to example 14 was excellent in the anti-adhesion property with respect to mayonnaise and ketchup, similar to the wet gel according to example 1-1. Furthermore, similar to the wet gel according to example 11-1, the wet gel according to example 14 was excellent in the anti-adhesion property with respect to water.

Example 15

The wet gel was obtained similar to example 1-1, except that 2.25 parts of isocetane as the first liquid and 0.75 parts of trichloro-octadecylsilane as the second liquid were used, instead of 3 parts of n-hexadecane. The wet gel was transparent and had plasticity.

Note that isocetane was able to dissolve the silicone resin composition. Furthermore, trichloro-octadecylsilane was able to be mixed with isocetane.

When the wet gel according to example 15 was left to stand for 1 hour, syneresis was progressed for the wet gel. Furthermore, when the wet gel according to example 15 was cut and left for 1 hour, syneresis was progressed on the cutting surface of the wet gel.

The wet gel according to example 15 was excellent in the anti-adhesion property with respect to mayonnaise and ketchup, similar to the wet gel according to example 1-1. Furthermore, similar to the wet gel according to example 11-1, the wet gel according to example 15 was excellent in the anti-adhesion property with respect to water.

Example 16-1

The wet gel was obtained similar to example 1-1, except that, for preparing the precursor solution, 0.15 parts of a 1% by weight n-hexane dispersion liquid of gold particles having an average particle diameter of 10 nm (manufactured by Shikoku Kogyo Co., Ltd.) was further added. The wet gel was transparent and had plasticity.

Note that n-hexane was the first solvent and was able to dissolve the silicone resin composition.

Example 16-2

The wet gel was obtained similar to example 16-1, except that a 1% by weight hexane dispersion liquid of platinum particles having an average particle diameter of 10 nm (manufactured by Shikoku Kogyo Co., Ltd.) was used, instead of the 1% by weight n-hexane dispersion liquid of gold particles having the average particle diameter of 10 nm. The wet gel was transparent and had plasticity.

When each of the wet gels according to examples 16-1 and 16-2 was left to stand for 1 hour, syneresis was progressed for the wet gel. Furthermore, when each of the wet gels according to examples 16-1 and 16-2 was cut and left for 1 hour, syneresis was progressed on the cutting surface of the wet gel.

The wet gel according to examples 16-1 and 16-2 were excellent in the anti-adhesion property with respect to mayonnaise and ketchup, similar to the wet gel according to example 1-1.

Reference Example 8-1

The wet gel was obtained similar to example 1-1, except that 2.4 parts of tetraethoxysilane and 0.6 parts of octyltriethoxysilane as the first liquid were used, instead of 3 parts of n-hexadecane. The wet gel was transparent and had plasticity.

Note that tetraethoxysilane and octyltriethoxysilane were able to dissolve the silicone resin composition.

Reference Example 8-2

The wet gel was obtained similar to reference example 8-1, except that added amounts of tetraethoxysilane and octyltriethoxysilane were changed to 2.1 parts and 0.9 parts, respectively. The wet gel was transparent and had plasticity.

Reference Example 8-3

The wet gel was obtained similar to reference example 8-1, except that added amounts of tetraethoxysilane and octyltriethoxysilane were changed to 1.8 parts and 1.2 parts, respectively. The wet gel was transparent and had plasticity.

Reference Example 8-4

The wet gel was obtained similar to reference example 8-1, except that added amounts of tetraethoxysilane and octyltriethoxysilane were changed to 1.5 parts and 1.5 parts, respectively. The wet gel was transparent and had plasticity.

Reference Example 8-5

The wet gel was obtained similar to reference example 8-1, except that added amounts of tetraethoxysilane and octyltriethoxysilane were changed to 1.2 parts and 1.8 parts, respectively. The wet gel was transparent and had plasticity.

Reference Example 8-6

The wet gel was obtained similar to reference example 8-1, except that added amounts of tetraethoxysilane and octyltriethoxysilane were changed to 0.9 parts and 2.1 parts, respectively. The wet gel was transparent and had plasticity.

Reference Example 8-7

The wet gel was obtained similar to reference example 8-1, except that added amounts of tetraethoxysilane and octyltriethoxysilane were changed to 0.6 parts and 2.4 parts, respectively. The wet gel was transparent and had plasticity.

Reference Example 8-8

The wet gel was obtained similar to reference example 8-1, except that added amounts of tetraethoxysilane and octyltriethoxysilane were changed to 0.3 parts and 2.7 parts, respectively. The wet gel was transparent and had plasticity.

When each of the wet gels according to reference examples 8-1 through 8-8 was left to stand for 1 hour, syneresis was not progressed for the wet gel. Furthermore, when each of the wet gels according to examples 8-1 through 8-8 was cooled, syneresis was not progressed for the wet gel.

The wet gels according to reference examples 8-1 through 8-8 were unfavorable in the anti-adhesion property with respect to mayonnaise and ketchup, similar to the cross-linked silicone resin according to reference example 1.

Example 17-1

The wet gel was obtained similar to example 1-1, except that 0.3 part of n-decane as the first liquid, and 2.7 parts of polyphenylmethylsiloxane TSF 437 (manufactured by MOMENTIVE) as the second liquid were used instead of 3 parts of n-hexadecane. The wet gel was transparent and had plasticity.

Note that n-decane was able to dissolve the silicone resin composition. Furthermore, of polyphenylmethylsiloxane was able to be mixed with n-decane.

Example 17-2

The wet gel was obtained similar to example 17-1, except that the added amounts of n-decane and TSF437 were changed to 0.6 parts and 2.4 parts, respectively. The wet gel was transparent and had plasticity.

Example 17-3

The wet gel was obtained similar to example 17-1, except that the added amounts of n-decane and TSF437 were changed to 0.9 parts and 2.1 parts, respectively. The wet gel was transparent and had plasticity.

Example 17-4

The wet gel was obtained similar to example 17-1, except that the added amounts of n-decane and TSF437 were changed to 1.2 parts and 1.8 parts, respectively. The wet gel was transparent and had plasticity.

Example 17-5

The wet gel was obtained similar to example 17-1, except that the added amounts of n-decane and TSF437 were changed to 1.5 parts and 1.5 parts, respectively. The wet gel was transparent and had plasticity.

Example 17-6

The wet gel was obtained similar to example 17-1, except that the added amounts of n-decane and TSF437 were changed to 1.8 parts and 1.2 parts, respectively. The wet gel was transparent and had plasticity.

Example 17-7

The wet gel was obtained similar to example 17-1, except that the added amounts of n-decane and TSF437 were changed to 2.1 parts and 0.9 parts, respectively. The wet gel was transparent and had plasticity.

When each of the wet gels according to examples 17-1 through 17-7 was left to stand for 1 hour, syneresis was progressed for the wet gel. Here, for the wet gels according to examples 17-3 through 17-7, the ratio of TSF437 increased, as n-decane was volatilized, and thereby syneresis was progressed. Furthermore, when each of the wet gels according to examples 17-1 through 17-7 was cut and left for 1 hour, syneresis was progressed on the cutting surface of the wet gel.

The wet gels according to examples 17-1 through 17-7 were excellent in the anti-adhesion property with respect to mayonnaise and ketchup, similar to the wet gel according to example 1-1.

Example 18-1

A transparent precursor solution was obtained by mixing 1 part of Sylgard 184 main agent (manufactured by Dow Corning Corporation) as the silicone resin composition, 0.1 parts of Sylgard 184 hardener (manufactured by Dow Corning Corporation), and 3 parts of polymethylphenylsiloxane AR 20 (Manufactured by Sigma-Aldrich Co.) as the first liquid also serving as a second liquid. Subsequently, $4 \times 10^{-4}$ parts of Karsted catalyst was added, and the mixture was left to stand at room temperature for 5 minutes to solidify the silicone resin composition, and thereby the wet gel was obtained. The wet gel was transparent and had plasticity

Example 18-2

The wet gel was obtained similar to example 18-1, except that the added amount of Karsted catalyst was changed to $4 \times 10^{-5}$ parts, and the mixture was left to stand for 4 hours. The wet gel was transparent and had plasticity.

When each of the wet gels according to examples 18-1 through 18-2 was left to stand for 1 hour, syneresis was progressed for the wet gel. Furthermore, when each of the wet gels according to examples 18-1 through 18-2 was cut and left for 1 hour, syneresis was progressed on the cutting surface of the wet gel.

The wet gels according to examples 18-1 and 18-2 were excellent in the anti-adhesion property with respect to mayonnaise and ketchup, similar to the wet gel according to example 1-1.

The present application is based on and claims the benefit of priority of Japanese Patent Application No. 2014-129294, filed on Jun. 24, 2014, and Japanese Patent Application No. 2015-100409, filed on May 15, 2015, the entire contents of Japanese Patent Application No. 2014-129294 and Japanese Patent Application No. 2015-100409 are hereby incorporated herein by reference.

The invention claimed is:

1. A wet gel comprising:
   a crosslinked silicone resin in which a silicone resin composition is solidified;
   a first liquid capable of dissolving the silicone resin composition; and
   one of a solid capable of being dissolved in the first liquid, and a second liquid such that a degree of swelling, when the crosslinked silicone resin is immersed in the second liquid, is less than a degree of swelling when the crosslinked silicone resin is immersed in n-dodecane,
   wherein the second liquid is capable of being mixed with the first liquid,
   wherein the solid capable of being dissolved in the first liquid is tristearin or lotus leaf extract, and
   wherein the second liquid is n-tetradecane, n-hexadecane, trichlorooctadecylsilane, polymethylphenylsiloxane or phenylmethylsiloxane-dimethylsiloxane copolymer.

2. The wet gel according to claim 1, wherein the first liquid serves as the second liquid.

3. The wet gel according to claim 1, wherein the silicone resin composition includes a chemical compound having a vinyl group and a chemical compound having a hydrosilyl group.

4. The wet gel according to claim 1, wherein the first liquid is alkane, silicone oil, polymethylphenylsiloxane, toluene, tetraalkoxysilane or polyalkoxysiloxane.

5. The wet gel according to claim 1, further comprising particles.

6. The wet gel according to claim 5, wherein the particles are silica particles, alumina particles, silver particles, gold particles, platinum particles or magnetic particles.

7. A method of producing a wet gel comprising:
   a process of solidifying a silicone resin composition in a presence of a first liquid capable of dissolving the silicone resin composition; and one of a solid capable of being dissolved in the first liquid, and a second liquid such that a degree of swelling, when a crosslinked silicone resin is immersed in the second liquid, the silicone resin composition being solidified in the crosslinked silicone resin, is less than a degree of swelling when the crosslinked silicone resin is immersed in n-dodecane,
   wherein the second liquid is capable of being mixed with the first liquid,
   wherein the solid capable of being dissolved in the first liquid is tristearin or lotus leaf extract, and
   wherein the second liquid is n-tetradecane, n-hexadecane, trichlorooctadecylsilane, polymethylphenylsiloxane or phenylmethylsiloxane-dimethylsiloxane copolymer.

8. A product in which wet gel is formed on a surface of a solid, wherein the wet gel comprises:
   a crosslinked silicone resin in which a silicone resin composition is solidified;
   a first liquid capable of dissolving the silicone resin composition; and
   one of the solid capable of being dissolved in the first liquid, and a second liquid such that a degree of swelling, when the crosslinked silicone resin is immersed in the second liquid, is less than a degree of swelling when the crosslinked silicone resin is immersed in n-dodecane, wherein the second liquid is capable of being mixed with the first liquid, wherein the solid capable of being dissolved in the first liquid is tristearin or lotus leaf extract, and wherein the second liquid is n-tetradecane, n-hexadecane, trichlorooctadecylsilane, polymethylphenylsiloxane or phenylmethylsiloxane-dimethylsiloxane copolymer.

\* \* \* \* \*